3,505,189
PROCESS FOR PRODUCTION OF A COMPOSITION FROM CARBON MONOXIDE AND NITROGEN

Roger I. Miller, Danville, Calif., assignor to Aerojet-General Corporation, El Monte, Calif., a corporation of Ohio
No Drawing. Filed Nov. 25, 1966, Ser. No. 596,815
Int. Cl. C08f 1/16
U.S. Cl. 204—157.1      9 Claims

ABSTRACT OF THE DISCLOSURE

A process for producing a water-soluble, nitrogen-containing compound comprising subjecting a gaseous mixture of carbon monoxide and nitrogen to high energy ionizing radiation with the ionizing radiation being absorbed in an amount in excess of $10^{20}$ electrons per gram of the gas mixture.

---

This invention is concerned with a process for promoting the chemical binding of elemental nitrogen with carbon monoxide to form a water-soluble compound.

The process of the invention is exceptionally attractive in that it provides a novel way for nitrogen fixation utilizing two inexpensive reactants, namely, nitrogen and carbon monoxide to produce a material having a high nitrogen content which, because of its water solubility, is suitable as a fertilizer component. It is unexpected that the normally non-reactive species of carbon monoxide and nitrogen would form a polymeric material.

The composition produced by the radiation process of the invention has an exceptionally high nitrogen content. The precise composition of the apparent polymer will vary considerably with the conditions employed and the volume fractions of the two components of the gas mixture. It has been established that the conventional forms of possible nitrogenous products, for example, $(CN)_2$ and various nitrogen oxides are absent. Apart from the nitrogen-containing polymer, the other identifiable product present in a detectable amount is the gas, carbon dioxide. The solid product appears to vary in composition as the proportions of the reactants vary, for example, a high carbon monoxide concentration produces a red-brown waxy solid containing a relatively low percentage of nitrogen, while a high nitrogen concentration provides a light yellow powder of a low density which contains a high percentage of nitrogen.

The present invention in accomplishing nitrogen fixation through the reaction of nitrogen and carbon monoxide utilizes various ionizing radiations, both particle radiation and radiation in the form sometimes regarded as ionizing electromagnetic radiation. Particle radiation includes streams of particles such as electrons produced by a linear accelerator, fission fragments, alpha particles, and the like, so directed that the particles impinge upon the mixture of nitrogen and carbon monoxide. The charged particles may be accelerated by means of a suitable voltage gradient, using such devices as a cathode-ray tube, resonant cavity accelerator, a Van de Graaff accelerator, a Cockcroft-Walton accelerator and the like as is well-known to those skilled in the art. Radiation provided by fission fragments is especially suitable. Gamma radiation and mixed pile radiation including neutrons, gamma, electrons and X-rays may be employed. It has been established that radiation available from a microwave discharge device will provide the energy needed to accomplish the reaction of nitrogen and carbon monoxide.

In the practice of the invention, the ionizing radiation is absorbed in the gas mixture in an amount in excess of $10^{20}$ electron volts per gram of the gas mixture. It has been established that the intensity (dose rate) of the radiation may vary widely as has been demonstrated by the successful use of the high intensity radiation of a linear accelerator on one hand and the significantly less intense radiation of a pure gamma-ray source ($Co^{60}$) on the other hand. A less intense radiation requires a much longer period of time to produce a significant amount of the polymer. For some unexplained reason, hydrogen and isopropyl alcohol used in small amounts, preferably less than one volume percent, will significantly increase the yield of the polymer, typically, for example, by a factor of about 15%. The pressure of the gas mixture may vary widely. Experiments conducted at varying pressures up to 4500 p.s.i.a. have demonstrated little pressure effect. Desirably, the temperature of the gas mixture during irradiation is held below 400° F., preferably in the range of 70° F. to 200° F. to minimize decomposition of the polymer products. The nitrogen generally comprises about 0.4 to about 0.98 volume fraction, preferably 0.7 to 0.95 volume fraction of the gas mixture. The nature of the solid product will vary slightly from each source of radiation, for example, gamma-ray experiments typically provided a product having a small percentage of nitrogen (around 2 to 3%) while high frequency microwave discharge experiments and high energy electron have provided a solid composition containing up to 30% nitrogen. $Co^{60}$ gamma doses of $\approx 10^{21}$ ev./g. gave the low nitrogen product, reactor ($n, \gamma$) doses of $\approx 2 \times 10^{21}$ ev./g. gave 15% nitrogen content, and fission fragment irradiation at $\approx 10^{22}$ ev./g. gave 16 to 18% nitrogen content; the Linac (linear accelerator) and microwave work used still higher doses and resulted in 30 to 35% nitrogen content. The mechanism of nitrogen fixation thus appears to involve the reaction of active nitrogen with a pre-formed solid, possibly polymeric, carbon suboxide. The dose rate provided by the various irradiation sources varies considerably as evidenced in the following Table I where the value is generally in excess of $1 \times 10^{15}$ electron volts per gram-second.

TABLE I

| | Dose Rate (ev./g.-sec.) | Total Dose (ev./g.) |
|---|---|---|
| Fission fragments (LRL) | Range $2-7 \times 10^{17}$ | $0.4-1.5 \times 10^{22}$ |
| Linear accelerator (RPI) | $\pm 2X$ Estimate $3 \times 10^{19}$ | $1.2 \times 10^{23}$ |
| Microwave discharge | $\pm 10X$ Estimate $10^{20}$ | To $\approx 10^{24}$ |
| Reactor mixed $n, \gamma$ | $\pm 2X$ Estimate $3 \times 10^{17}$ | $2 \times 10^{21} - 4 \times 10^{22}$ |
| Gamma $Co^{60}$ | $\pm 2X$ Estimate $10^{15}$ | $10^{21}$ |

EXAMPLE I

In the work of this example small stainless steel capsules having a volume of 30 cubic centimeters were loaded with nitrogen and carbon monoxide gases at a pressure of 1500 p.s.i.a. Fissionable material was provided in the form of an open mass of fine glass wool containing $U_3O_8$ incorporated as a solid solution in a matrix of silica, there being about 1.85 grams of $U^{235}$ per capsule. The individual fibers were about 3 microns or less in diameter so that fission fragments could escape therefrom to traverse the surrounding reactants. Each capsule was formed as a primary vessel designed to withstand high pressures and was surrounded by a housing adapted to carry a cooling gas such as nitrogen for controlling temperatures of the primary vessel containing the reactants and fissionable material. Average temperature of the reactants was maintained at about 110° F. The volume fractions of nitrogen and carbon monoxide provided in the several test runs vary as indicated in Table II. For example, in the test run of capsule 9N–1 the volume percent of nitrogen is 15% and that of carbon monoxide, 85%. The capsules were irradiated for six hours in the Livermore (California) Pool Type Reactor, thus providing an ionizing radiation having an energy disposition (absorption) in the gas mixture in excess of $10^{20}$ electron volts per gram of the gas mixture. Following radiation the capsules of the respective tests were removed from the reactor and the gas and the solid polymer found in each capsule were examined. Apart from the polymer, the only other identifiable product was carbon dioxide. The results of the several test runs are set forth in Table II.

TABLE II.—IRRADIATION CONDITIONS AND YIELDS IN CO—N₂ MIXTURES

| Capsule Number | Temperature (° F.) | Pressure (p.s.i.a.) | Composition, percent N₂ | Composition, percent CO | G Value Fixed Nitrogen | G Value CO |
|---|---|---|---|---|---|---|
| 9N-1 | 110 | 1,500 | 15 | 85 | ¹ 0.40 | 2.2 |
| 2 | 110 | 1,500 | 35 | 65 | 0.87 | 1.7 |
| 3 | 110 | 1,500 | 55 | 45 | (²) | 1.3 |
| 4 | 110 | 1,500 | 75 | 25 | ¹ 1.52 | 0.9 |
| 5 | 110 | 1,500 | 85 | 15 | ¹ 1.35 | 0.6 |
| 6 | 110 | 1,500 | 95 | 05 | ¹ 1.41 | 0.5 |
| 10N-19 | 110 | 1,500 | 65 | 35 | 1.10 | 1.3 |
| 20 | 110 | 1,500 | 75 | 25 | 1.59 | 1.3 |
| 21 | 110 | 1,500 | 85 | 15 | 1.50 | 1.0 |
| 22 | 110 | 1,500 | 95 | 05 | 1.65 | 0.7 |
| 23 | 110 | 1,500 | 98 | 02 | 1.46 | 0.6 |
| 24 | 110 | 1,500 | 100 | | 0.01 | |
| 12N-3 | 110 | 1,500 | 80 | 20 | (³) | (⁴) |
| 4 | 110 | 1,500 | 80 | 20 | (³) | (⁴) |
| 5 | 110 | 1,500 | 90 | 10 | (³) | (⁴) |
| 6 | 110 | 1,500 | 90 | 10 | (³) | (⁴) |

¹ Small samples of solid removed.
² DMSO wash.
³ All solids removed for analysis.
⁴ Not measured.

The G value of Table II is an expression of the yield in number of molecules formed per 100 electron volts of energy deposited in the reactants.

The solid polymer was observed in the irradiations of CO—N₂ mixtures of this Example I to vary in appearance from a light yellow powder in high N₂ loadings to a dark red-brown lumpy material at 85% CO. Most of the solids clung to the fuel fibers but could be dislodged easily; the powder had very low density, held a static charge, and was difficult to handle. All of the material that could be isolated was removed from capsule set 12 N and used for chemical tests. A photomicrograph (at ≈100×magnification) of the polymer established the small size and irregular shape of the solid particles.

Chemical tests on solids from Run 12N showed that the solid material was soluble in water, formamide, dimethylformamide, dimethylsulfoxide, formic acid, pyridine and concentrated sulfuric acid. No other common solvents were significantly effective. Upon hydrolysis, the solid formed a strong acid (pK<4) and a 5 g./l. concentration was measured to have a pH of 2.4. The acid could not be identified by spot tests (for formic, hydrocyanic, cyanic or nitric acids) or by thin layer chromatography (for formic, oxalic, malonic, tartaric or oxamic acids). An attempt to prepare a dinitrophenylhydrazine derivative of any aldehydes or ketones present was unsuccessful. Spot tests for formaldehyde, cyanide, cyanate, oxidants, oxamide, inositol and nitrate were negative. A test for reductants was positive.

Samples of solid product from 90% N₂-10% CO mixtures were weighted and analyzed for fixed nitrogen. The results ranged from 13 to 18%, reflecting an apparent non-homogeneity of the solid.

Gases from capsules in the 9N run were analyzed by mass spectrometry specifically for $(CN)_2$ at mass 52. The low background in this area and no detection of any peak indicated <20 p.p.m. $(CN)_2$ in these capsules. However, a small concentration of $H_2$ was observed in the 9N gases and was finally traced to contamination in the CO loading cylinder. The presence of 0.13% $H_2$ in the CO supply was considered inconsequential.

Samples of solids were removed from most of the capsules in Run 9N for preparation of KBr discs for infrared absorption measurements. A spectrum was obtained from 95% N₂ – 5% CO product; the absorption bands are very broad and show N—H bonding, carbonyl and possibly amide structure. A small absorbance due to $CO_2$ is apparent at 2350 cm.⁻¹, and another at 2260 cm.⁻¹ is attributed to nitrile groups. The spectrum of 15% N₂-85% CO mixture was obtained and illustrates a shift of N—H absorbance to lower wave number and a stronger and broader carbonyl absorbance; the 760 cm.⁻¹ band, attributed to N—H rock, has disappeared. Although the $CO_2$ peak is present, the nitrile absorbance at 2260 cm.⁻¹ has disappeared. Reruns of the KBr discs after storage at 30° C. for approximately one month gave spectra showing a large increase in the $CO_2$ peak, but otherwise unchanged.

A sample of capsule 9N-4 aqueous solution was put through a Kjeldahl analysis without any digestion step, with the result that 26% of the fixed nitrogen was obtained; this indicates that about ¼ of the fixed nitrogen is in a readily available form, such as an ammonium salt. Spot tests for $NH_3$ in the aqueous solution were positive.

Aqueous solutions of product from capsules 9N-2 and 6 formed brown (with 9N-2) and yellow (with 9N-6) flocculent precipitates with Ag(I), Hg(II) and Pb(II) ions.

EXAMPLE II

The work of this example was undertaken to provide adequate solid material to perform an elemental analysis. Because of the limited capacity of the stainless steel capsules, several runs were performed under like conditions and the solids were collected from all the runs before attempting the analysis. Test runs were performed with the same equipment of Example I and at a temperature of 110° F. and a pressure of 1500 p.s.i.a. The gas composition in all runs was 90% nitrogen and 10% carbon monoxide. After a thorough mixing, aliquots were taken and upon analysis gave the following composition:

N=13.3±0.8% (4 samples)

O=41.3±14.7% (5 samples)

C=30.9±15.8% (8 samples)

The errors involved with oxygen and carbon analyses by combustion techniques probably indicate difficulty in getting complete breakdown of the sample.

A small amount of solid in an open melting point tube started to darken in color in the region of 80–100° C. Some melting occurred at about 130° C. and evaporation or decomposition was appreciable. At 170° C. the dark residue appeared to soften but did not completely melt at temperatures over 200° C. Gases evolved during pyrolysis include $CO_2$, HCN and $(CN)_2$.

A qualitative examination of a solution of the solids in water shows that there is some urea present.

EXAMPLE III

This example is concerned with the irradiation of a carbon monoxide and nitrogen gas mixture with a powerful linear accelerator for one hour. The radiation was carried on under the following conditions:

Feed Composition _____ 90% N₂, 10% CO.
Temperature _____ Container at 10° C.
Pressure _____ 450 p.s.i.a.
Volume _____ 2 liters.
Irradiation _____ 25 mev. e⁻ @ 4 kw. for 1 hr.
Yield _____ 4.7 grams solid.

Elemental analysis of the solid product gave the following results:

| | Analysis 1 | Analysis 2 |
|---|---|---|
| Percent: | | |
| C | 32.53 | 33.5 |
| N | 30.24 | 29.45 |
| O | 34.46 | 33.5 |
| H | 2.79 | |
| Total | 100.02 | |

The elemental composition corresponds to an empirical formula of approximately $C_5H_5N_4O_4$. The origin of so much hydrogen, amounting to about 0.13 gram, is hard to account for by water in the gas mixture (about 1 gram water required); part of the hydrogen is probably the result of moisture absorbed by the solid product when exposed to the atmosphere. Accordingly, the elemental composition of the polymer as formed during irradiation would be $C_{3.58}N_{2.78}O$.

Infrared absorption spectra of this solid product present broad bands very similar to those obtained from solids prepared via fission fragment irradiation of Example I. The spectrum shows absorption attributed to N—H bonding ($\approx 3400$ cm.$^{-1}$ and 770 cm.$^{-1}$), carbonyl (1700 to 1750 cm.$^{-1}$) and amide linkages (generally 1700 to 1500 cm.$^{-1}$). Pyrolysis tests yielded HCN as product but the polymer itself does not demonstrate any appreciable nitrile band (2250 cm.$^{-1}$). It is apparent that the polymers produced by fission fragment irradiation and the high energy electron radiation of this Example III are essentially alike.

Pyrolysis tests were conducted in vacuo to determine what products formed during decomposition of this solid. A sample weighing 0.25 gram was evacuated to $<1\mu$ pressure and heated slowly. At 200° C. the pressure increased at a rate equivalent to gas formation of $\approx 5$ cc./min. A trap was then cooled with liquid nitrogen and all gaseous products condensed as the sample temperature was raised to 600° C. After pyrolysis, the total gas evolved amounted to 38 cc., which consisted of $\approx 50\%$ HCN, 35% $CO_2$, 10% CO and 3% $(CN)_2$, as measured by gas chromatography. The presence of HCN, $CO_2$ and CO was confirmed by the infrared spectrum of a gas sample.

A second sample of polymer, weighing 0.43 gram was taken for repetition of this test; the sample had been made into a pellet by pressing at $\approx 1000$ p.s.i. The pyrolysis was performed at higher temperature (using a Meker burner) and resulted in $\approx 85$ cc. of gas evolution. The composition of the gas was approximately the same as in the previous test. The weight loss during heating amounted to 0.245 gram and did not match the weight of gases collected (0.13 gram).

During pyrolysis, a small amount of white solid deposited on the cooler portions of the heated quartz tube. Sufficient material was available for preparation of KBr discs for infrared scans. One spectrum shows a complex bonding pattern, similar to the starting material, but showing more definition of N—H and amide absorbances, and an interesting sharp absorbance at 2150 cm.$^{-1}$. This is the characteristic region for conjugated nitriles or isocyanide bonding.

An appreciable amount of black residue formed in both pyrolysis tests. Small aliquots of the residues were analyzed and found to contain 39 and 44% nitrogen respectively. The second pyrolysis test residue was sufficient to provide a carbon analysis also, revealing 44% carbon content. Thus the pyrolyzed material leaves a skeleton of high thermal stability which is very akin to paracyanogen.

A photograph of the polymer having a very large magnification of $\approx 2000\times$ shows small lobes of material with $\approx 1\mu$ diameters clustering together. After pyrolysis in vacuum, the residue has an appearance indicating great condensation, but no evidence of melting.

A sample of residue from pyrolysis was also prepared for infrared spectrophotometry. The features of this spectrum indicate loss of carbonyl bonding ($\approx 1700$ cm.$^{-1}$), the presence of some conjugated nitrile or isocyanide group, and otherwise a less well defined structure than the original solid.

Solutions were prepared of this polymer in water (there is a small amount of insoluble matter) or dilute base solution (complete solubility) and spot tests were performed with the following results:

| | |
|---|---|
| Formaldehyde test | Negative. |
| Formic acid test | Do. |
| Ammonia test (heating) | Positive. |
| Hydrazine test | Negative. |
| Cyanide ion test (2 methods) | Do. |
| Cyanate ion test | Do. |
| Hydroxylamine test | Do. |
| Nitrate, nitrite ion test | At detection limit. |
| Oxidants | Negative. |
| Reductants | Positive. |

EXAMPLE IV

This example is concerned with the production of the nitrogen containing polymer of the process of the invention with the use of a microwave discharge device.

Passage of a nine to one nitrogen-carbon monoxide mixture through a 2450 megahertz microwave discharge for eight hours forms a dark solid material in the discharge zone. Elemental analysis gives the composition 3.1% $H_2$, 36.2% C, 35.4% $N_2$ with the balance being oxygen.

EXAMPLE V

The work of this example was undertaken to investigate the effect of additives on the irradiation of the nitrogen-carbon monoxide mixture. From a large number of prospective materials investigated it was found that small volume fractions of hydrogen or isopropyl alcohol were effective to increase yield. The tests were conducted in accordance with the conditions of Example 1. It was established using suitable controls that hydrogen or isopropyl alcohol employed in small amounts, preferably in a range up to 5 volume percent of a gas mixture will significantly increase the yield of the nitrogen polymer up to about 15%.

EXAMPLE VI

Two $Co^{60}$ gamma ray sources, each $\approx 35$ curies, were available for experiments. These sources were of odd geometry and could not be accurately positioned with respect to samples, so that only a very rough approximation of dose could be made. Three pressure vessels were filled with 90% $N_2$, 10% CO mixture at $\approx 1500$ p.s.i.a. and irradiated for 200 to 400 hours. The maximum dosage was calculated to be over $10^{21}$ ev. per gram.

A very pale yellow solid was observed in all the vessels; it was very hygroscopic and electrostatic. Sufficient material was available to obtain IR spectra and to run Kjeldahl analysis for the nitrogen content. The solid contained only 2 to 3% nitrogen.

One vessel was carefully opened in a dry atmosphere and the solid pressed into a KBr disc using a sandwich technique to eliminate exposure to the atmosphere. The spectrum of this sample was shown to be nearly identical to the product obtained by fission fragment irradiation of similar gas mixtures, without regard to air exposure.

EXAMPLE VII

Several runs were made in which a 2-liter pressure vessel was filled with 90% $N_2$, 10% CO gas mixtures and irradiated in the Aerojet-General Nucleonic Industrial Reactor to obtain solid product from the effects of mixed neutron and gamma irradiations. Gas loadings were about 1200 p.s.i.a. and the temperature was held reasonably constant at $\approx 100°$ F. Both temperature and pressure were monitored during the runs, but no loss of pressure was apparent.

The calculated gamma dose rate was something less than $10^{21}$ ev. per gram per hour, while the neutron flux of $\approx 5 \times 10^{11}$ n/cm.$^2$-sec. probably contributed to make the total dose rate $\approx 10^{21}$ ev./g.-hr.

Irradiation for 2 hours resulted in a barely detectable amount of solids ($\approx 5$ to 10 mg.), but the IR spectrum of the material looked identical to that of the solid from $Co^{60}$ irradiations. A 14-hour irradiation resulted in much more solid, about 0.25 g. Samples were analyzed to contain 34.4% C, 2.7% H, and 20.4% N.

A longer irradiation was performed (40 hr.) to provide larger samples; its composition was 36.7% C, 3.0% H, and 18.7% N. The IR spectrum of this material was identical to previous solids; it also was removed in a dry atmosphere and analyzed with minimal exposure to air.

While several embodiments of the invention have been illustrated and described, it will be understood that the invention should not be construed as being limited thereto, but only to the lawful scope of the appended claims.

I claim:

1. A process for producing a water-soluble nitrogen-containing compound, said process comprising:
   subjecting a gaseous mixture of carbon monoxide and nitrogen to high energy ionizing radiation and recovering a water-soluble compound containing essentially carbon, nitrogen and oxygen, said ionizing radiation being absorbed in an amount in excess of $10^{20}$ electron volts per gram of the gas mixture.

2. A process in accordance with claim 1, wherein the nitrogen comprisees from about .4 to .98 volume fraction of the gas mixture.

3. A process in accordance with claim 1, wherein the nitrogen comprises from about .7 to .95 volume fraction of the gas mixture.

4. A process in accordance with claim 1, wherein the gas mixture during ionization is maintained at a temperature below about 400° F.

5. A process in accordance with claim 1, wherein isopropyl alcohol is incorporated in the gas mixture in a small amount, said alcohol serving to significantly increase the yield of the compound.

6. A process in accordance with claim 1, wherein hydrogen is incorporated in the gas mixture in a small amount, said hydrogen serving to significantly increase the yield of the compound.

7. A process in accordance with claim 1, wherein the ionization is provided by fission fragments.

8. A process in accordance with claim 1, wherein the ionization is provided by high energy electrons.

9. A process in accordance with claim 1, wherein the ionization is provided by gamma cobalt$^{60}$ source.

References Cited

UNITED STATES PATENTS 2,898,277   8/1959   Harteck et al. _____ 204—157.1

HOWARD S. WILLIAMS, Primary Examiner